US006381243B1

(12) United States Patent
Ekstedt

(10) Patent No.: US 6,381,243 B1
(45) Date of Patent: Apr. 30, 2002

(54) DETERMINING TIME SLOT DELAY FOR ATM TRANSMISSION

(75) Inventor: Ulf Ekstedt, Saltsjöbaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/156,654

(22) Filed: Sep. 18, 1998

(51) Int. Cl.[7] .................................................. H04J 3/07

(52) U.S. Cl. ...................... 370/395; 370/396; 370/400; 370/519

(58) Field of Search ................................. 370/395, 396, 370/397, 503, 507, 508, 509, 516, 476, 254, 256, 400, 401, 402, 473, 472, 458, 459, 519

(56) References Cited

U.S. PATENT DOCUMENTS

| | | | | | |
|---|---|---|---|---|---|
| 5,251,239 A | * | 10/1993 | Turban | .................. | 375/365 |
| 5,471,466 A | * | 11/1995 | Cooperman | .................. | 370/366 |
| 5,568,486 A | | 10/1996 | Huscroft et al. | | |
| 5,774,469 A | * | 6/1998 | Wirkerstrand | .................. | 370/473 |
| 5,963,564 A | * | 10/1999 | Petersen | .................. | 370/503 |
| 6,034,955 A | * | 3/2000 | Takase | .................. | 370/362 |
| 6,041,043 A | * | 3/2000 | Denton | .................. | 370/254 |
| 6,188,692 B1 | * | 2/2001 | Huscroft | .................. | 370/395 |
| 6,208,654 B1 | * | 3/2001 | Moteki | .................. | 370/395 |

OTHER PUBLICATIONS

International Telecommunication Union, "ATM Cell Mapping into Plesiochronous Digital Hierarchy (PDH)", Digital Networks, ITU–T, Telecommunication Standardization Sector of ITU, ITU–T Recommendation G.804, Nov. 1993.

International Telecommunication Union, "Synchronous Frame Structures used at 1544, 6312, 2048, 8488 and 44 736 kbit/s Hierarchical Levels", General Aspects of Digital Transmission Systems, ITU–T, Telecommunication Standardization Sector of ITU, ITU–T Recommendation G.704, Jul. 1995.

International Telecommunication Union, "Physical/Electrical Characteristics of Hierarchical Digital Interfaces", General Aspects of Digital Transmission Systems Terminal Equipments, CCITT, The International Telegraph and Telephone Consultative Committee, Recommendation G.703, Apr. 1991.

(List continued on next page.)

*Primary Examiner*—Douglas Olms
*Assistant Examiner*—Ricardo M. Pizarro
(74) *Attorney, Agent, or Firm*—Nixon & Vanderhye, P.C.

(57) ABSTRACT

A time slot aligner (60) determines delay (in terms of frames) of time slots of a set of frames received on Plesiochronous Digital Hierarchy (PHD) transmission network. In accordance with the time slot frame/delay determination technique of the invention, the time slot aligner finds an initial header of an ATM cell by searching five consecutive time slots in nearby frames of the set of frames. Once the initial header is found, a frame/delay value is determined for each time slot comprising the header. The frame/delay values for selected time slots of the header are then used to form a window which is used for searching for the next header. Searching for a next header for a next ATM cell involves sliding the window to other frames of the set of frames and searching for a value in a successive time slot which will form a HEC byte for a header framed by the sliding window. When a next header is located, a frame/delay determination has to be made only for the last time slot of the header, e.g., the time slot which formed the HEC byte. A new window is then formed using the frame/delay pattern from the most-recently acquired header, and that new window slid to find yet another header. Header location, time slot frame/delay determination, and formation of a new window continue until a frame/delay determination is made for all time slots of the set of frames.

23 Claims, 14 Drawing Sheets

OTHER PUBLICATIONS

Dodds et al, "ATM Framing Using CRC Byte", Serving Humanity Trhough Communications, Supercomm/ICC, New Orleans, May 1–5, 1994, vol. 1, May 1, 1994, pp. 410–414.

Dodds et al., ATM Framing Acquisition, Communications, Computers and Power in the Modern Environment, Saskatoon, May 17–18, 1993, May 17, 1993, pp. 56–60.

* cited by examiner

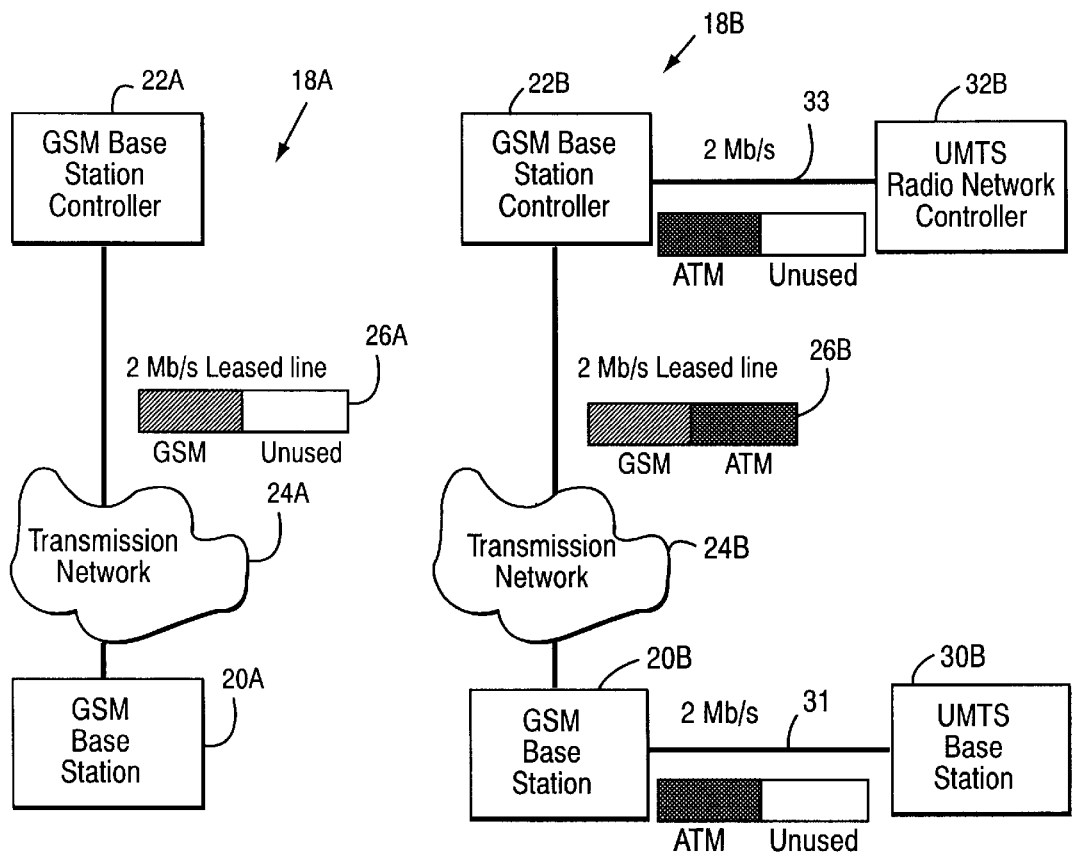
Fig. 1A
Fig. 1B
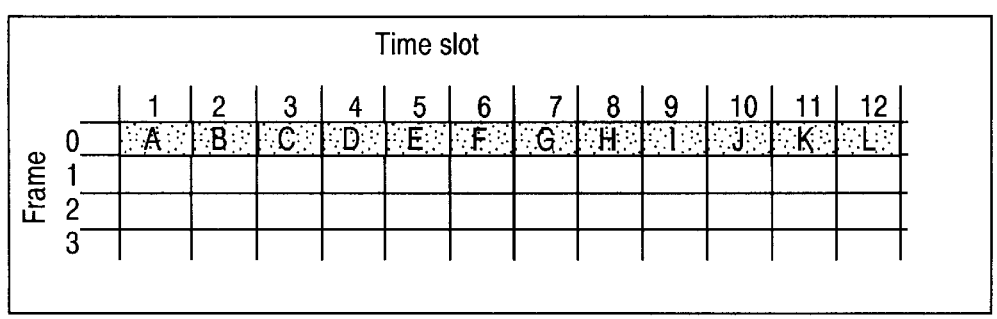
Fig. 2A
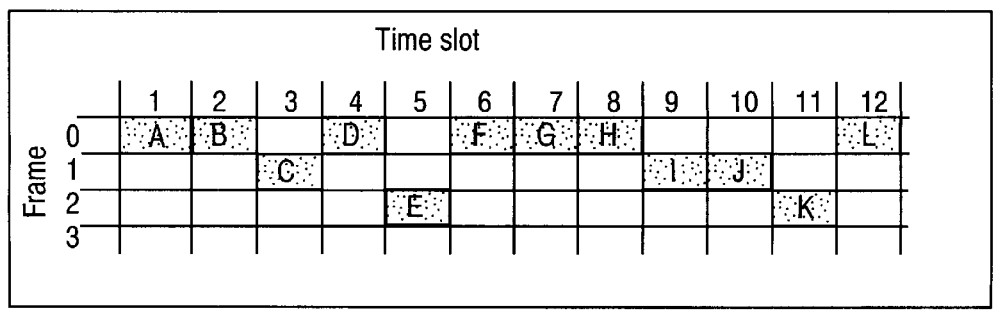
Fig. 2B

| Maximum difference in delay (frames) | Initial search (cycles) | Cycles in mowing windows | Cycles for Presynch | Maximum cycles | Maximum Aligning time(s) |
|---|---|---|---|---|---|
| 1 | $2^5$=32 | 25*2=50 | 26*6=156 | 238 | 1.6 |
| 2 | $3^5$=243 | 25*3=75 | 26*6=156 | 474 | 3.1 |
| 3 | $4^5$=1024 | 25*4=100 | 26*6=156 | 1280 | 8.5 |
| 4 | $5^5$=7776 | 25*5=125 | 26*6=156 | 3406 | 22 |
| 5 | $6^5$=16807 | 25*6=150 | 26*6=156 | 8082 | 53 |
| n | $(n+1)^5$ | (Used Time slots-5)* (n+1) | (Used Time slots-4)* presynch | Sum of 3 previous values | 53/Frame rate* Previous value |

|        | 0   | 1   | 2   | 3   | 4   | 5   | 6   |     | 13  |
|--------|-----|-----|-----|-----|-----|-----|-----|-----|-----|
| FRAME 1 | HA1 | HA2 |     | HA4 | HA5 |     |     |     |     |
| FRAME 2 |     |     | HA3 |     |     |     |     |     |     |
| FRAME 3 |     |     |     |     |     |     |     |     |     |
| FRAME 4 |     |     |     |     |     |     |     |     |     |
| FRAME 5 |     | HB1 |     | HB3 | HB4 |     |     |     |     |
| FRAME 6 |     |     | HB2 |     |     |     |     |     |     |
| FRAME 7 |     |     |     |     |     | HB5 |     |     |     |
|         |     |     |     |     | ... |     |     |     |     |
| FRAME 53 |    |     |     |     |     |     |     |     |     |

WA points to column 4, Frame 1 area.

Fig. 5A

|  | 0 | 1 | 2 | 3 | 4 | 5 | 6 | 13 |
|---|---|---|---|---|---|---|---|---|
| FRAME 1 | HA1 | HA2 |  | HA4 | HA5 |  |  |  |
| FRAME 2 |  |  | HA3 |  |  |  |  |  |
| FRAME 3 |  |  |  |  |  | PA1 |  |  |
| FRAME 4 WA |  |  |  |  |  |  |  |  |
| FRAME 5 |  | HB1 |  | HB3 | HB4 |  |  |  |
| FRAME 6 |  |  | HB2 |  |  |  |  |  |
| FRAME 7 |  |  |  |  |  | HB5 |  |  |
|  |  |  |  |  | ... |  |  |  |
| FRAME 53 |  |  |  |  |  |  |  |  |

Fig. 5B

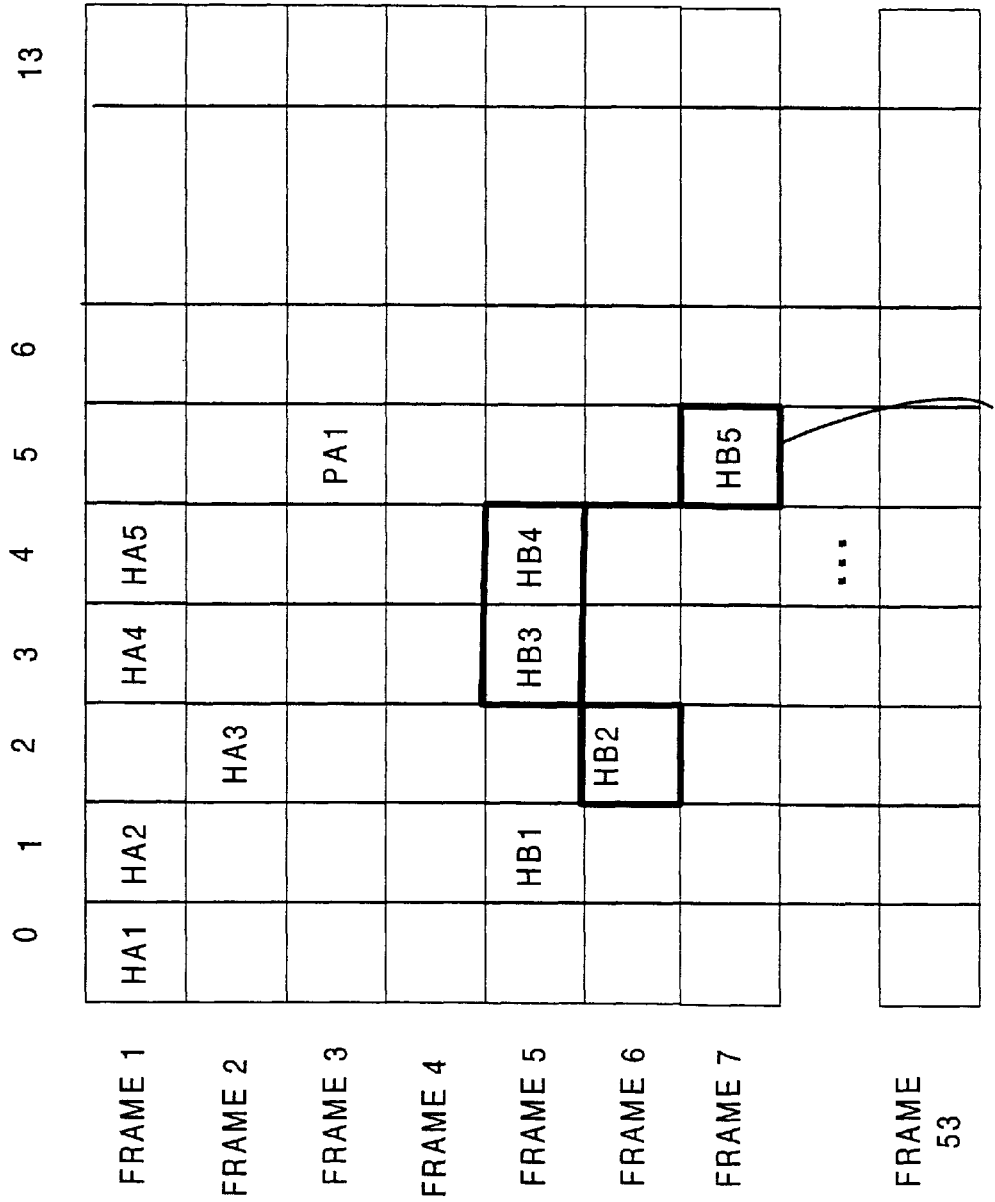

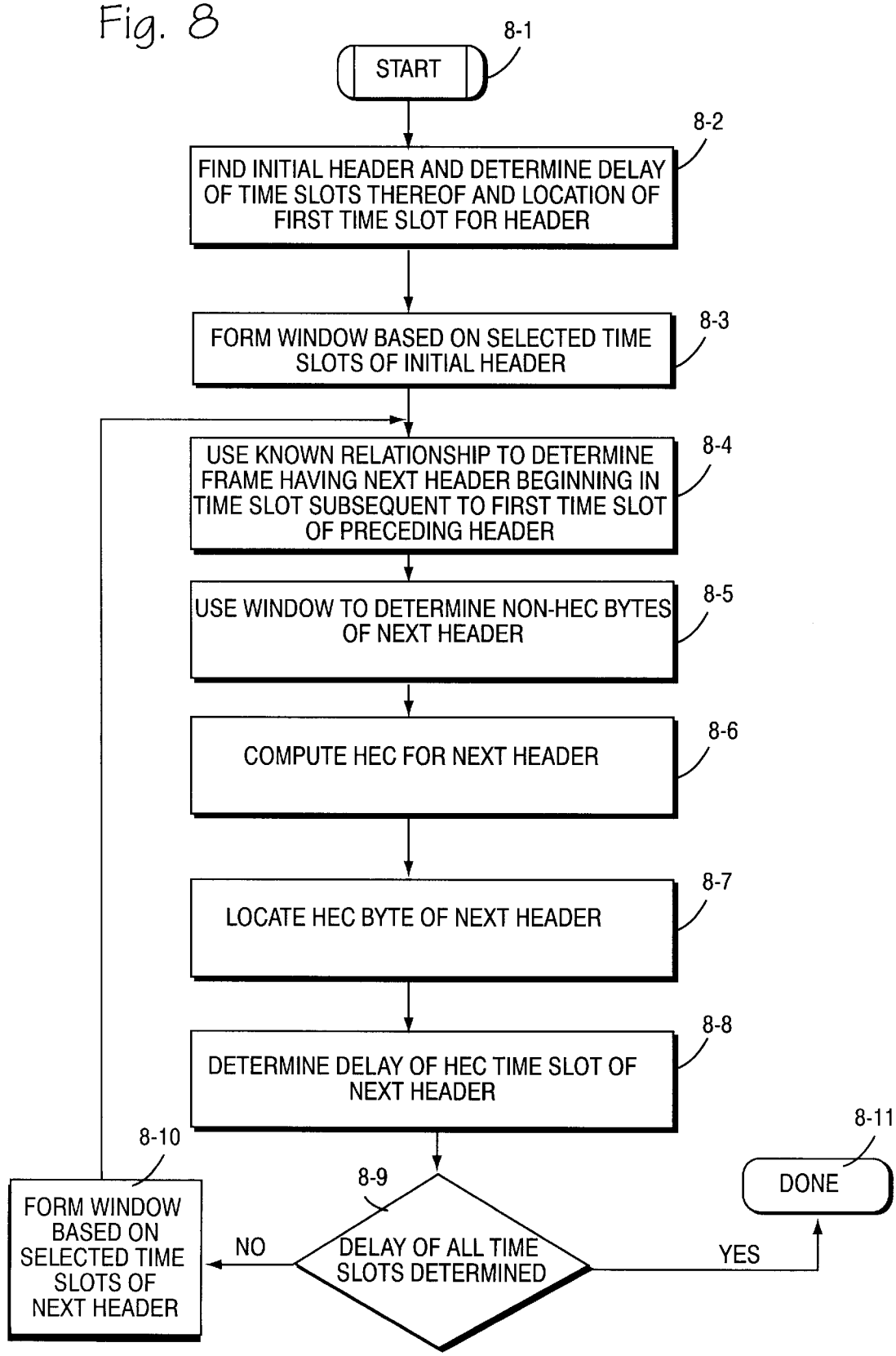

These combinations are not tested since a valid alignment was found

DETERMINING TIME SLOT DELAY FOR ATM TRANSMISSION

BACKGROUND

1. Field of the Invention

The present invention pertains to the packet technology known as Asynchronous Transfer Mode (ATM), and particularly to determining delay (in terms of frames) of time slots of a multiframe received on Plesiochronous Digital Hierarchy (PHD) transmission network.

2. Related Art and Other Considerations

The increasing interest for high band services such as multimedia applications, video on demand, video telephone, and teleconferencing has motivated development of the Broadband Integrated Service Digital Network (B-ISDN). A suitable technique to support B-ISDN is know as Asynchronous Transfer Mode (ATM), which offers considerable extension of telecommunications capabilities.

ATM is a packet-oriented transfer mode which uses asynchronous time division multiplexing techniques. Packets are called cells and traditionally have a fixed size. A traditional ATM cell comprises 53 octets, five of which form a header and forty eight of which constitute a "payload" or information portion of the cell. The header of the ATM cell includes a Header Error Control (HEC) byte, as well as two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

At its termination points, an ATM network is connected to terminal equipment, e.g., ATM network users. Typically between ATM network termination points there are plural switching nodes, the switching nodes having ports which are connected together by physical transmission paths or links. Thus, in traveling from an originating terminal equipment to a destination terminal equipment, ATM cells forming a message may travel through several switching nodes.

A switching node has a plurality of ports, each of which can be connected by via a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for plural connections, a connection being e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

Currently ATM transmission networks for lower speed applications are primarily based on Plesiochronous Digital Hierarchy (PHD) transmission networks (see ITU-T Recommendation G.702). A mapping for transport of ATM cells on the different PDH bit rates, e.g., for both 1544 and 2048 frame structures, has been provided (see ITU-T Recommendation G.804, ATM Cell Mapping Into Plesiochronous Digital Hierarchy (PHD) (November 1993). These frame structures are described in ITU-T Recommendation G.704, "Synchronous Frame Structures Used At 1544, 6312, 2048, 8488 and 44 734 kbit/s Hierarchical Levels (July 1995). Each frame of a multiframe has a series of time slots, the time slots having an octet structure.

The mapping of ATM cells into a frame as specified in ITU-T Recommendation G.804 subsumes certain basic principles for both 1.5 and 2 Mb/s PCM based ATM connections. These basic principles are as follows: (1) The ATM cells are mapped into all time slots in a consecutive order (each ATM cell covering several times slots); (2) the bytes in the ATM cell are aligned with the octet structure of the frames; (3) the cells have a 53 byte rate and are not aligned to the frame structure; (4) time slots 1–15 and 17–31 are used for ATM cells in the 2 Mb/s connection (time slot 16 not being used); (5) time slots 1–24 are used for ATM cells in the 1.5 Mb/s connection; (6) the forty eight bytes of ATM cell payload can be scrambled in order to protect against false delineation; (7) empty cells are transmitted as fillers. The empty cells can be of three types: an idle cell, an unassigned cell, and an IMA filler cell. An idle cell has a predetermined header of the following octet values (in hexadecimal as indicated by the suffix "H"): 00H, 00H, 00H, 01H, and 52H (the 52H being the Header Error Control (HEC) byte). The payload of the ATM idle cell has each of its forty eight octets having the value 6AH. An unassigned cell has a header with the following octet values: 00H, 00H, 00H, 00H, 55H. In Inverse Multiplexing for ATM ("IMA"), filler cells replace idle cells. The filler cell for IMA has the pattern 00H,00H, 00H,0BH, and 64H.

Fractional mapping involves the use of only a portion of the time slots of a frame, e.g., from one to thirty time slots. Fractional mapping can be conceptualized as a screening mask, where each time slot can be either in a state "used" or a state "unused". Fractional mapping in general is specified in ITU-T Recommendation G.704. Fractional mapping-for ATM per se is not specified in ITU-T Recommendation G.804, but the fractional mapping of ITU-T Recommendation G.704 can be applied to ATM.

Since the ATM cell length of 53 octets is a prime number, the headers of ATM cells will move periodically over all time slots (as long as the number of used time slots per frame is less than 53). When the number of used time slots is less than 53, the following characteristics will apply: (1) Each time slot will contain the start byte of an ATM cell exactly one time within a 53 frame interval; (2) Five consecutive time slots will have a complete ATM header within a 53 frame multiframe or period; (3) There will be a deterministic number of frames between the beginning of an ATM cell in time slot n and the beginning of an ATM cell in time slot n+1

As described below, there are envisioned technologies in which the time slots used for ATM transport may be delayed. What is needed therefore, and an object of the present invention, is a technique for aligning time slots to compensate for such delay.

BRIEF SUMMARY OF THE INVENTION

A time slot aligner determines delay (in terms of frames) of time slots of frames received on Plesiochronous Digital Hierarchy (PHD) transmission network. In accordance with the time slot frame/delay determination technique of the invention, the time slot aligner finds an initial header of an ATM cell by searching five consecutive time slots in nearby frames. Once the initial header is found, a frame/delay value is determined for each time slot comprising the header. The frame/delay values for selected time slots of the header are then used to form a window which is used for searching for the next header. Searching for a next header for a next ATM cell involves sliding the window to other frames and searching for a value in a successive time slot which will form a HEC byte for a header framed by the sliding window. When a next header is located, a frame/delay determination has to be made only for the last time slot of the header, e.g., the time slot which formed the HEC byte. A new window is then formed using the frame/delay pattern from the most-recently acquired header, and that new window slid to find yet another header. Header location, time slot frame/delay determination, and formation of a new window continue until a frame/delay determination is made for all time slots.

Two modes of the time slot frame/delay determination technique are provided, particularly a Trial and HEC-Error mode and an Idle Cell Aligner mode. In the Idle Cell Aligner mode, once an initial header of an idle cell is located a known relationship is employed to determine which frame has the header of a next ATM cell beginning in a predetermined location, e.g., the second time slot of initial header. The predetermined relationship and the window of the initial header is used to locate all non-HEC bytes of the next header. Using the contents of non-HEC bytes of the next header, a HEC value is computed for that next header. The computed HEC value is then located in appropriate time slot, and the frame/delay therefor determined. Until frame/delay determinations are made for all time slots, the Idle Cell Aligner mode continues to look for a new header, to determine the frame/delay of the last time slot thereof (the HEC time slot), and to form a new window for use (in combination with the known relationship) for locating another header.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a schematic view of a prior art mobile telecommunications system having spare transmission capacity.

FIG. 1B is a schematic view of a mobile telecommunications system enhanced with an ATM-based service which uses spare transmission capacity.

FIG. 2A and FIG. 2B are schematic views of portions of frames, with FIG. 2A illustrating a situation of no delay and FIG. 2B illustrating time slot frame/delay.

FIG. 5A, FIG. 5B, and FIG. 5C are schematic views providing are sequential depictions of example frames upon which the Trial and HEC-Error mode as depicted in FIG. 4 operates.

FIG. 8 is a flowchart showing basic steps executed in connection with a Idle Cell Aligner mode of the time slot alignment determination technique of the invention.

DETAILED DESCRIPTION OF THE DRAWINGS

Figures 3, 13:
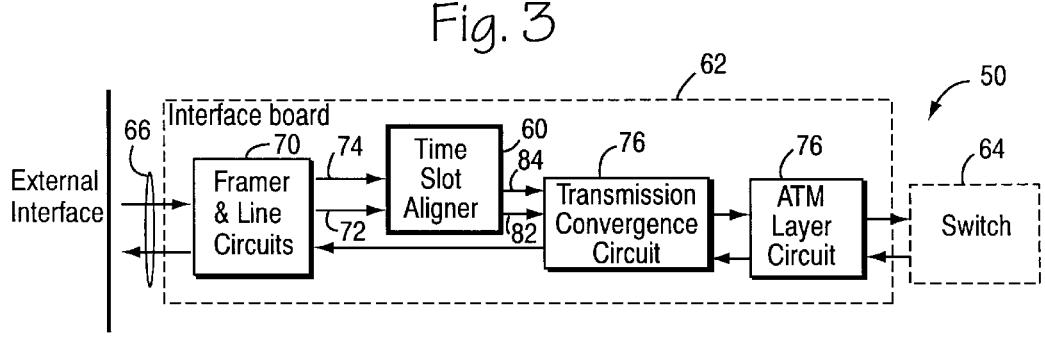
FIG. 3 is a schematic view of an example ATM node which includes a time slot aligner of the present invention.
FIG. 13 is a chart showing performance values for the time slot alignment determination technique of the present invention.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

An example innovative technology in which ATM cells are mapped into PDH frames is illustrated with reference to FIG. 1A and FIG. 1B. FIG. 1A actually shows a prior art mobile telecommunications system 18A comprising base station 20A connected to base station controller 22A by a transmission network generally depicted as 24A. Although not illustrated, it will be appreciated that base station 20A is in radio frequency communication with mobile stations over the air interface. Base station controller 22A can be connected to other base station controllers and, via gateway(s), to other telecommunications networks. In the illustrated embodiment, mobile telecommunications system 18A takes the form of the Global System for Mobile communications (GSM), utilized, e.g., in Europe.

As illustrated in FIG. 1A, the 2 Mb/s transmission network 24A may have only a portion of its bandwidth utilized by the GSM-based service (as indicated by crosshatching in the "leased line" rectangle 26A). In order to capitalize upon unused capacity of the existing infrastructure, modifications are made resulting in mobile telecommunications system 18B in which a new ATM-based service, also known as UMTS, is added. In the enhanced mobile telecommunications system 18B, an ATM-based base station 30B is connected to GSM base station 20B by 2 Mb/s link 31 and an ATM-based radio network controller (RNC) 32B is connected to GSM base station 22B by 2 Mb/s link 33. The ATM-based service uses the spare transmission capacity in the existing GSM network as illustrated by the "leased line"

rectangle 26B. The enhancement is implemented by adding ATM nodes to existing nodes without significant changes or disturbances of existing configurations and traffic.

Although most of the existing GSM networks are time slot oriented, many of the GSM switches are capable of handling only 64 kb/s connections. Moreover, if several 64 kb/s connections are switched together, different time slot delays may result. Further, there may be situations in which it is desirable to use some or all of the time slots in a PCM-based 1.5 and 2 Mb/s connection for ATM service.

FIG. 2A and FIG. 2B are schematic views of portions of frames. As used herein, a "frame" is as described in ITU-T Recommendation G.804, and comprises (for example) 32 or 34 time slots (for 2 Mbps and 1.5 Mbps, respectively). The frame is repeated with a repetition rate of 8 kHz, with one time slot referring to one of the 64 kbps channels of a frame. In FIG. 2A, the bytes A–L of an ATM cell are shown as being consecutively received in twelve consecutive time slots of the same frame, i.e., frame 0. FIG. 2A thus illustrates a situation of no delay. FIG. 2B, on the other hand, illustrates a possible scenario resulting from the frame of FIG. 2B being switched in a 64 kb/s based switch. With reference to the scenario depicted in FIG. 2B, it is said that byte C of time slot 3 has a frame/delay of "1"; byte E of time slot 5 has a frame/delay of "2"; and so forth.

Thus, as illustrated by FIG. 2B, upon establishing a connection for receiving ATM cells under such circumstances there must be a technique for determining or calibrating the frame/delay for each time slot. By "frame/delay" is meant the number of frames by which a byte in a specified time slot is offset from a reference byte of the ATM cell. The reference byte can be, for example, the first or last byte (HEC byte) of the header of the initial ATM cell. As understood hereafter, the frame/delay can be a positive number (indicating that the byte is found in the specified time slot in a subsequent frame) or a negative number (indicating that the byte is found in the specified time slot in a preceding frame). The process of determining frame/delay with respect to time slots is herein referred to as "time slot alignment determination" or time slot delay calibration.

The time slot alignment of the present invention, the operation of which is subsequently described in more detail, is implemented in a time slot aligner of an ATM node. FIG. 3 shows an example ATM node 50 in which a time slot aligner 60 of the present invention can be utilized. Time slot aligner 60 is situated on an interface board 62 which is located intermediate the node's ATM switch 64 and an external interface 66. The example ATM node 50 can be, for example, any of the nodes of mobile telecommunications network 18B (see FIG. 1B), such as radio network controller 32B or base station 30B. In the case of ATM node 50 being radio network controller 32B, the external interface 66 is or is connected to link 33. In the case of ATM node 50 being base station 30B, the external interface 66 is or is connected to link 31.

On interface board 62 frames are received from external interface 66 by framer & line circuits 70. The time slot aligner 60 receives from framer & line circuits 70 both frame data and rate (over line 72) and a frame sync signal (on line 74). Frame data and rate and the frame sync signal are output from time slot aligner 60 to transmission convergence circuit 76 over lines 82 and 84, respectively. ATM layer circuit 76 bidirectionally connects transmission convergence circuit 76 with ATM switch 64. On the egress side, transmission convergence circuit 76 is connected to the framer & line circuits 70.

An interface port, such as interface board 62 of FIG. 3, has three conventional states according to ATM standards. These three states are: Hunt, Presync, and Sync. In order to achieve a general goal of the present invention (finding a delay compensation for each time slot) in the illustrated embodiment, a new state called "Align Hunt" is implemented. This new Align Hunt state is entered if the states of Hunt and Presync have been unsuccessful for a predetermined time (e.g., 30 seconds). It is in the Align Hunt state that the modes of the present invention are performed. The Align Hunt state is exited when a sample has been successfully aligned (e.g., a frame/delay determined for each time slot). The Align Hunt state is not entered, however, if the line has a fault on the physical medium such as LOS or AIS.

As indicated above, a general goal of the present invention is to find a delay compensation for each time slot. While there are two modes of operation of the time slot alignment determination technique implemented by time slot aligner 60 of the present invention, both modes utilize the same basic principles. A first mode is known as the "Trial and HEC-Error" mode; a second mode is known as the "Idle Cell Aligner" mode.

Figure 4:
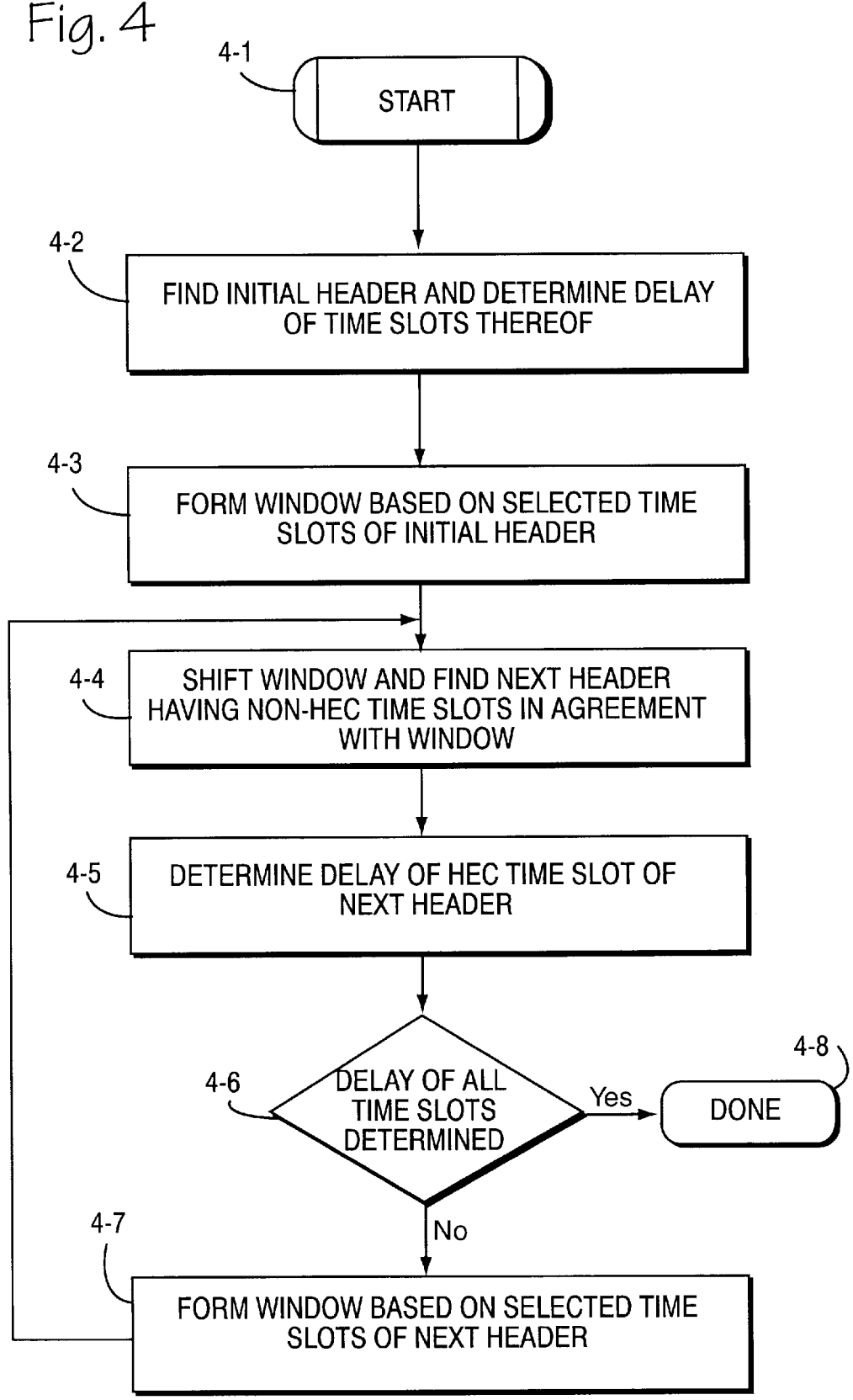
FIG. 4 is a flowchart showing basic steps executed in connection with a Trial and HEC-Error mode of the time slot alignment determination technique of the invention.

Basic steps involved in the Trial and HEC-Error mode are shown in FIG. 4. FIG. 5A represents an example set of frames upon which operation of the Trial and HEC-Error mode will be described. As used herein, a "set of frames" means the input frames that are used for the aligning procedure. In the case of the Trial and HEC-Error mode, the set of frames is the continuous flow of frames that are used during the alignment procedure. For the described example, the set of frames comprises fifty three frames, with each frame having thirteen time slots (as labeled across the top of the set of frames of FIG. 5A). The Trial and HEC-Error mode monitors the received data in real time, e.g., uses the continuous data that is provided by a source at the other end of the network. Upon start up of the Trial and HEC-Error mode, some storing of frames in a frame delay memory is required in order to test different compensations (e.g., delays) of the time slots. That is, in the Trial and HEC-Error alignment determination technique, upon start up some of the frames of the set of frames are stored in a memory for initial analysis.

Step 4-1 of FIG. 4 represents the beginning of the Trial and HEC-Error mode time slot alignment determination technique of the invention. At the start, at least some of the set of frames is loaded into memory. Then the first step of the Trial and HEC-Error mode, step 4-2, is performed. At step 4-2, the time slot aligner 60 finds an initial header in the set of frames, and determines an alignment for each of the time slots in the initial header.

Figure 4A:
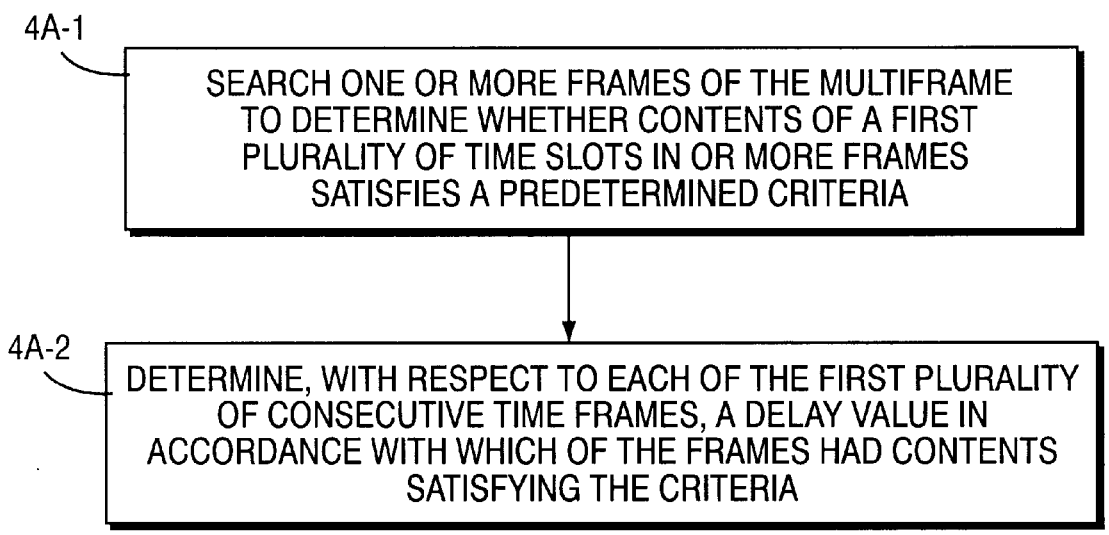
FIG. 4A is a flowchart showing substeps of a selected step of FIG. 4.

Substeps involved in step 4-2 are shown in FIG. 4A. As a first substep 4A-1, the time slot aligner 60 searches for one or more frames of the set of frames in order to determine whether contents of a first plurality of consecutive time slots in the one or more frames satisfies a predetermined criteria, e.g., form a header with a valid HEC. As will be recalled, the ATM header has five octets, the fifth of which is the Header Error Control (HEC) byte (HEC) whose contents is mathematically based on the contents of the first four bytes of the header. Thus, at substep 4A-1, the time slot aligner 60 searches the first five columns (time slots) of the set of frames, looking for one or more frames from which a valid header can be constituted from the first five time slots of any of those frames. That is, the time slot aligner 60 tests different combinations of delays in these five time slots until a valid combination, e.g., a valid header, is found. The validation of the header, known as "presync", is accomplished by looking for correct headers in this window with a frequency of exactly 53 frames. As it turns out in the example of FIG. 5A, a first header HA is found with bytes HA1–HA5 (byte HA5 being the HEC for header HA). Conveniently, all bytes of header HA were found in the first frame (FRAME 1), but time slot aligner 60 had to look to FRAME 2 to find a byte in time slot 2 (the third time slot) which would result in formation of a valid header with respect to time slots 0–1 and 3–4 of FRAME 1.

As used herein, the phrase "consecutive time slots" is employed from an ATM point of view. The used time slots in the PDH frame do not need to be consecutive. In other words, from an ATM point of view the last three time slots and the first two time slots in a frame are consecutive time slots.

After the first valid header (e.g., header HA) is located at substep 4A-1, at substep 4A-2 the frame/delay value for the time slots forming the first valid header can be determined. In the example of FIG. 5A, for instance, the time slots 0–4 have a "0" frame/delay value, while time slot 2 has a frame/delay value of "1" since the byte in time slot 2 constituting the first valid header (e.g., header HA) is offset by one frame from the frame of the reference byte for the first valid header. Thus, in substep 4A-2, the delay value is determined for each of the first plurality of consecutive time slots, the delay value being determined in accordance with which of the frames had contents satisfying the criteria of the header (e.g., contents belonging to the header as adjudged from other octets of the header and the located HEC of the header).

Upon detection of a valid first header (e.g., header HA) and determining the frame/delay values for its time slots, at step 4-2 an initial window is formed based on selected time slots of the initial header. In the illustrated example, the selected time slots of the header are all but the first time slot of the header. For example, the pattern of frame/delays shown in FIG. 5A is depicted as window WA (for header HA). The window WA has the frame/delay pattern of 0,+1, 0,0.

At step 4-4 the window WA is moved through the frames of the set of frames in order to find a next header. The moving of window WA is in the row direction of the set of frames, as illustrated by movement of frame WA in the manner shown in FIG. 5B. Time slot aligner 60 slides the template-like pattern of window WA along the frames of the set of frames, and at each movement or vertical shift of window WA, checks only the values in time slot 5 looking for a byte that would form an HEC byte for the bytes framed by the moving window WA. FIG. 5B shows that time slot aligner 60, using window WA, has found a next valid header HB. As shown in FIG. 5B, the header 5B comprises the five octets HB1–HB5 from each of consecutive time slots 1–5.

Upon locating the next header (e.g., header HB), time slot aligner 60 need not determine the frame/delays of the first four bytes of header HB, as the frame/delays for those time slots are constant from one frame to another. But time slot aligner 60 must determine the delay of the HEC byte for the next header, e.g., the HEC byte HB5 of header HB in the example of FIG. 5B. Step 4-5 thus shows time slot aligner 60 making a determination of the frame/delay of the HEC-containing time slot of the next header. In the example of FIG. 5B, the HEC byte HB5 of header HB, which occurs in time slot 5, has a frame/delay of +2. Therefore, throughout the entire set of frames, time slot 5 will have a frame/delay of +2. For example, the first octet PA of the payload of the cell having header HA will also have a frame/delay of +2, so that the first octet PA of the payload of the cell having header HA is in FRAME 3 in FIG. 5B.

At step 4-6 a determination is made whether alignment has been determined for all time slots of the set of frames. In the example described thus far with reference to FIG. 5A and FIG. 5B, such is not the case, as only five of the thirteen time slots have had their frame/delays determined. Thus, when time slots yet remain for frame/delay determination, execution continues at step 4-7 wherein a new window is formed based on selected time slots (e.g., all but the first time slot) of (what has so far been considered) the next header (e.g., header HB). At step 4-7, time slot aligner 60 forms yet a new window based on the frame/delay pattern of all but the first byte of header HB. In this regard, FIG. 5C shows the new window WB based on the frame/delay pattern of all but the first byte of header HB.

When it has been determined that there yet remain time slots whose frame/delay must be determined, execution branches back to step 4-4 so that the newly devised window can be utilized to find yet another header. For example, in a second execution of the loop comprising steps 4-4 through 4-8, window WB would be employed (at step 4-4) to find a next header (an unillustrated header HC in the FIG. 5C example). The frame/delay of the HEC byte of that next header HC would be determined at step 4-5, followed by the determination of step 4-6, and so forth.

The looped steps of FIG. 4 are executed until a frame/delay value has been determined for all time slots of the set of frames. The number of executions of the loop of FIG. 4 is expressed by the quantity N−(q+1), wherein q is the number of octets (bytes) comprising the headers of the ATM cell (conventionally q=5). Thus, for the example shown in FIG. 5A–FIG. 5C, the loop of steps 4-4 through 4-6 is executed N=8 times after determination of the first header HA.

Figure 6:
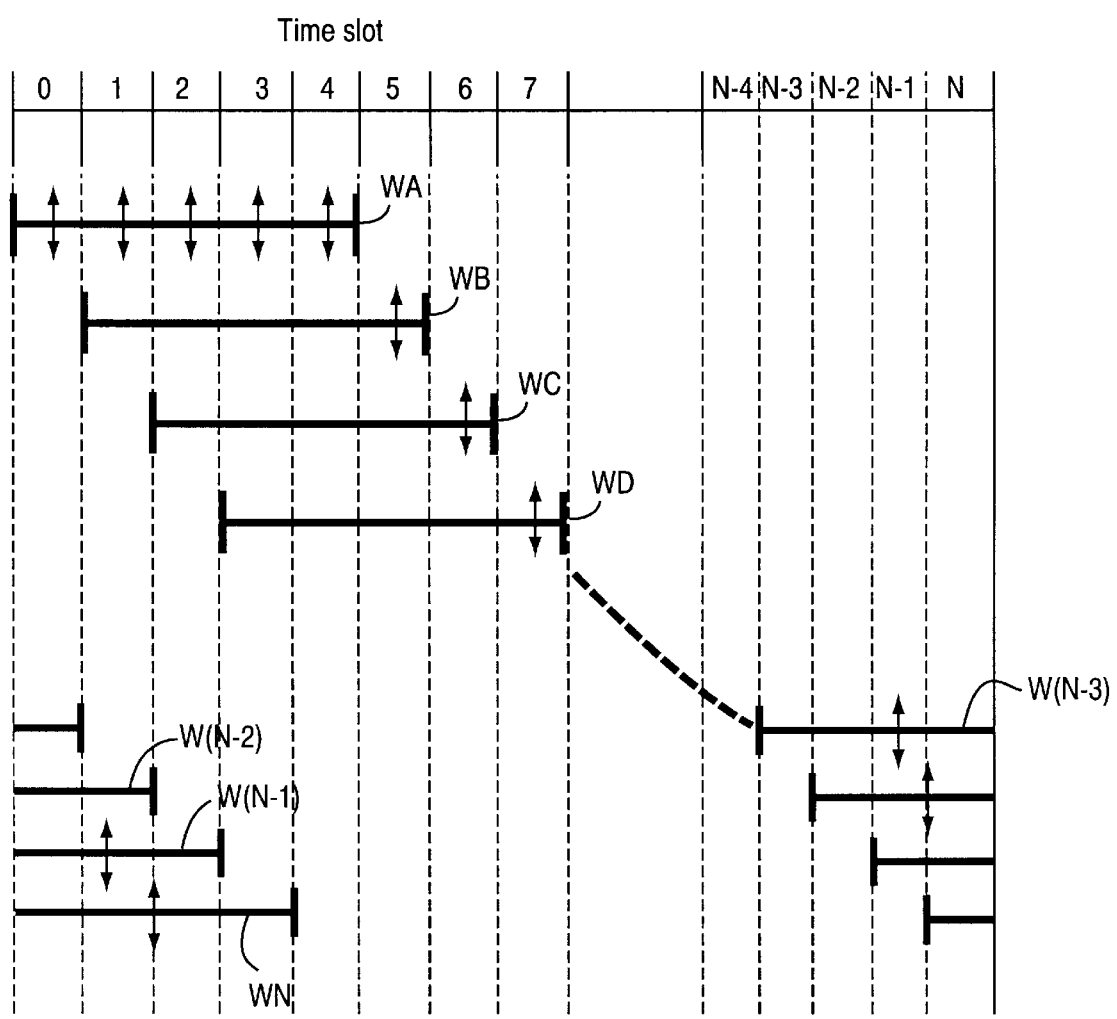
FIG. 6 is a schematic view showing movement of a window through frames in accordance with the Trial and HEC-Error mode of FIG. 4.

FIG. 6 illustrates movement of the window of the invention through a set of frames in search of headers having first bytes located in subsequent times slots. For example, window WA of FIG. 6 represents the window formed upon locating the first header HA in the set of frames. The bidirectional arrows proximate window WA of FIG. 6 reflect the fact that a search had to be made through multiple frames for all five bytes of header HA. The window WB for the second header (e.g., header HB) is offset one time slot from window WA. The sole bidirectional arrow proximate window WB is indicative of the fact that the widow WA could be used to find the first four bytes of header HB, and that time slot aligner 60 had to search only for one time slot, e.g., the last time slot (i.e., the HEC byte), and to determine the frame/delay value only for that one time slot. FIG. 6 further shows the shifting of the windows WC, WD, etc. horizontally across the set of frames. While for simplicity FIG. 6 shows the windows as traveling in a vertically descending manner while shifting through the set of frames, it should be kept in mind that a unidirectional window travel is not required, and that (depending on the frame delays) the travel of the windows vertically (e.g., with respect to frame numbers) may vary.

FIG. 6 also reflects the fact that the frame/delay for each time slot is tested on five headers. For example, as shown in FIG. 6, the frame/delay of time slot 4 is tested five times—for WA, WB, WC, WD and WE.

When frame/delay values have been determined in the manner of FIG. 4 for all time slots, the time slot aligner 60 is done with the Trial and HEC-Error mode time slot alignment determination technique (see step 4-8) and can receive other set of frames and, based on the time slot alignments determinations already made, process the set of frames by making proper slot alignments and thereby recovering full ATM cells.

Figure 7:
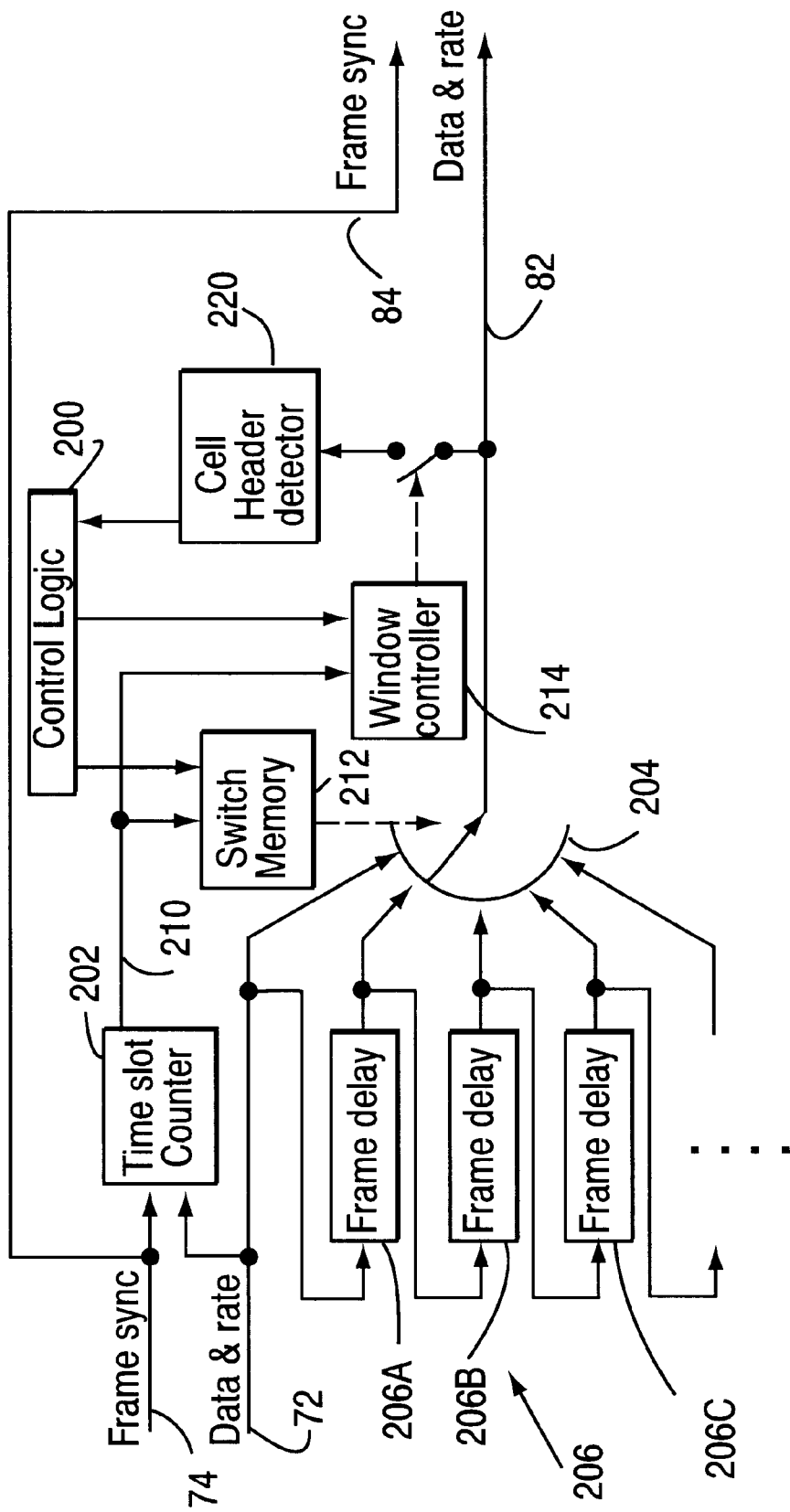
FIG. 7 is a schematic view of functional blocks employed in a time slot aligner which performs the Trial and HEC-Error mode of FIG. 4.

FIG. 7 shows major function blocks of a time slot aligner 60 which implements the Trial and HEC-Error mode time slot alignment determination technique having the functions (e.g., steps) basically described in FIG. 4. The time slot aligner 60 of FIG. 7 receives the data and rate on line 72 and the frame sync signal on line 74. The frame sync signal is applied both to a controller 200 and to time slot counter 202. The data and rate is applied to time slot counter 202, to a switch 204, and to a bank of frame delay memories 206. Each of the registers or frame locations 206A, 206B, etc. in the bank of frame delay memories 206 is connected to apply its output either to switch 204 or to a successive one of the frame delay memories 206. A time slot count value as determined by time slot counter 202 is outputted (as represented buy line 210) to of a switch memory 212 and a window controller 214. Both switch memory 212 and a window controller 214 are under supervision of controller 200. A cell header detector 220 is connected to analyze the output of switch 204 in search of a cell header.

In a calibration phase the time slot aligner 60 performs the frame/delay determinations for each time slot of a sample set of frames (according to the Trial and HEC-Error mode) upon establishment of an ATM connection. Thereafter, in a normal traffic phase, the time slot aligner 60 performs the time slot alignment for traffic set of frames in accordance with the frame/delays as determined in the calibration phrase. For the calibration phase, consecutive frames from the sample set of frames upon which the Trial and HEC-Error mode technique is performed are serially shifted into the bank 206 of frame delay memories. Under supervision of controller 200 the Trial and HEC-Error mode technique is initiated, with controller 200 controlling e.g., switch memory 212 for the reading out of frames from selected memories of bank for the analyses. Cell header 220 performs the functions of step 4-2 of FIG. 4 in finding an initial header, as well as finding subsequent headers as the window is moved. Window controller 214 is responsible, using information gleaned from cell header detector 220 and under supervision of controller 200, for forming the window (step 4-3 and step 4-7) and moving the window (step 4-4) in connection with the search for other headers.

The bank 206 of frame delay memories are first-in-first-out memories, and can be of a fixed size that corresponds to frame length (e.g., 256 bits for a standardized 2 Mb/s signal; 193 bytes for a 1.5 Mb/s). Switch 204 serves to compensation upon readout for different frame delays. The top position of the switch corresponds to a maximum frame/delay, the next position corresponds to one frame less of frame/delay, and so on. The frame delay memories in bank 206, switch 204, and time slot counter 202 are preferably realized in a single circuit, but can be discrete components. As mentioned above, various components of slot aligner 60 can be fabricated using FPGA, PGA, or an ASIC, and controller 200 can be realized by a microprocessor, for example.

FIG. 8 shows basic steps involved in the Idle Cell Aligner mode of the time slot alignment determination technique of the present invention. Step 8-1 shows beginning of the Idle Cell Aligner mode, wherein, among other activities, an entire first set of frames is stored for use in the time slot alignment determination technique. In the case of the Idle Cell Aligner mode, the set of frames is 53 frames plus additional frames for a margin For a set of frames of thirty one time slots, about 2 kilobytes of memory would be required. At step 8-2, the time slot aligner 60 operating according to the Idle Cell Aligner mode finds an initial header and determines alignment of the time slots thereof. Additionally, at step 8-2 the time slot aligner 60 notes the location (time slot) of the first byte of the header.

While having similar objectives as step 4-1 of the Trial and HEC-Error mode of FIG. 4, step 8-2 of the Idle Cell Aligner mode has a differing implementation. At step 8-2, the time slot aligner 60 searches the entire set of frames looking for an idle cell header. By convention, an idle cell header is defined to have the following values (depicted in hexadecimal, as indicated by the suffix "H"): 00H, 00H, 00H, 01H, 52H, wherein the 52H is the HEC byte for the idle cell. During establishment of an ATM link, the cell flow is initially almost entirely idle cells, so that searching for an idle cell during initiation of the Idle Cell Aligner mode is not a problem. After link establishment, the frequency of idle cells is directly related to the load on the ATM link.

Figure 8A:
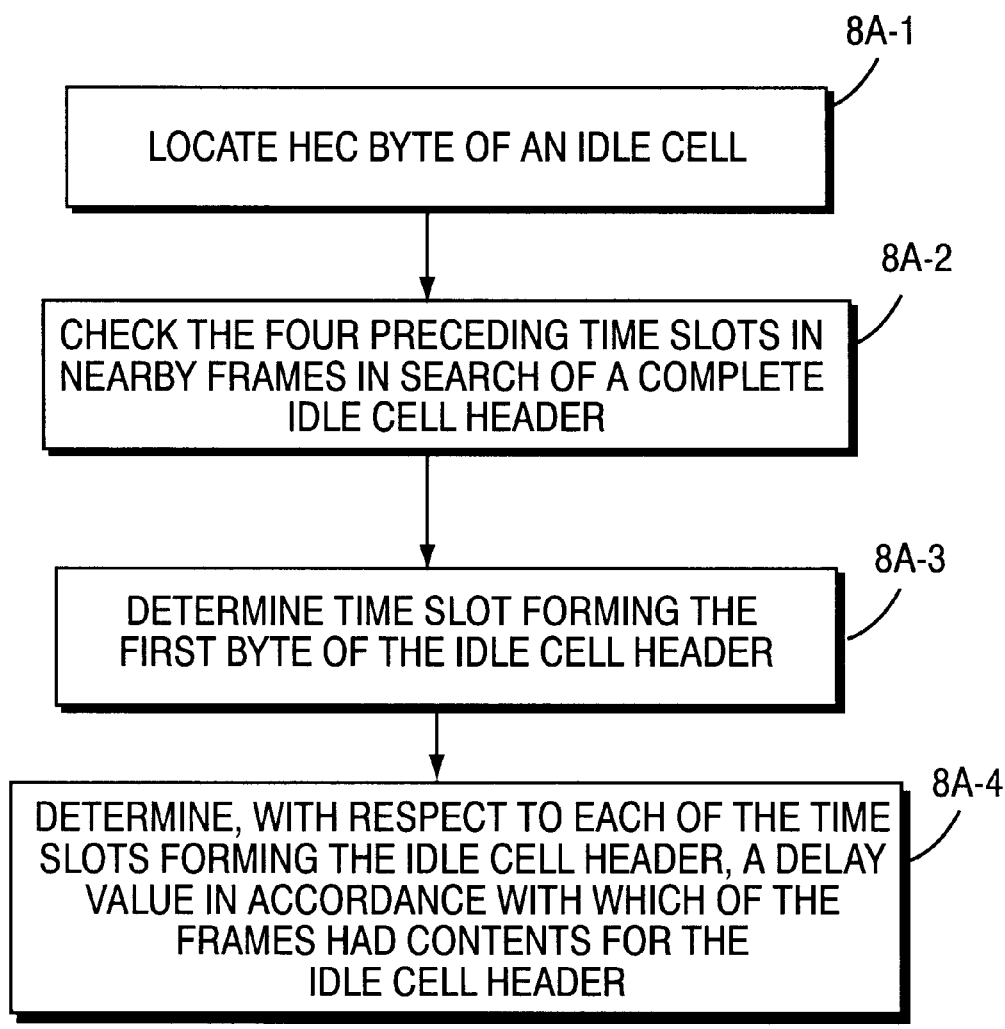
FIG. 8A is a flowchart showing substeps of a selected step of FIG. 8.

The initial task of the Idle Cell Aligner mode, detecting the initial header, e.g., step 8-2, comprises various substeps as shown in FIG. 8A. The first substep 8A-1 is to locate the HEC byte (i.e., 52H) of an idle cell. Then, as substep 8A-2, the time slot aligner 60 checks the preceding three time slots in nearby frames in order to find (in reverse order) the next three preceding bytes of the header, i.e., the pattern 01H, 00H, and 00H. The first byte of the header is found by the moving alignment technique previously described. When an entire idle cell header is found, the location (e.g., time slot) of the first byte is noted as substep 8A-3. Then, in similar manner with the Trial and HEC-Error mode of FIG. 4, at substep 8A-4 the time slot aligner 60 determines, with respect to each of the time slots forming the idle cell header, a frame/delay value in accordance with which of the frames had contents for the idle cell header.

Figure 9:
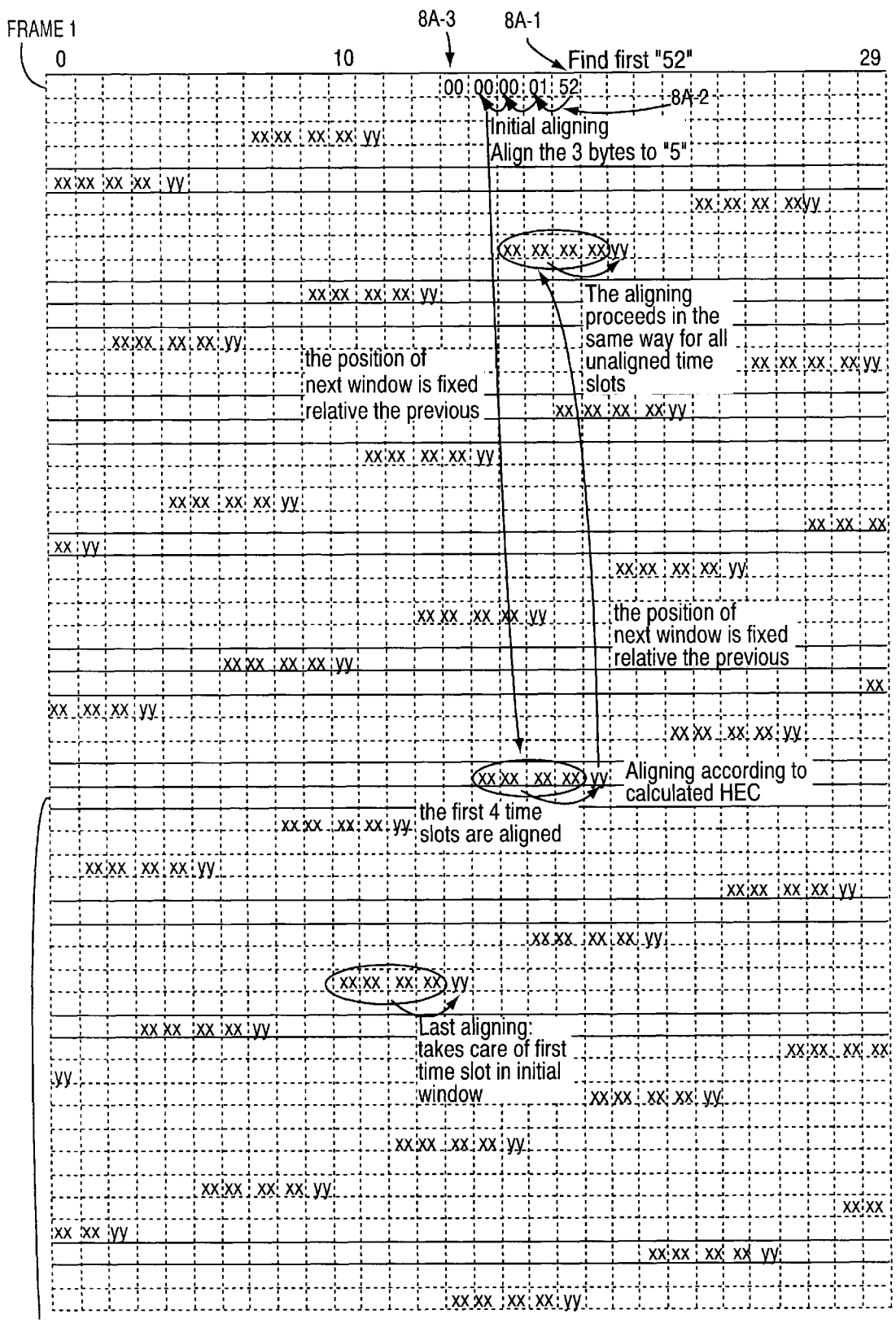
FIG. 9 is a schematic view of example frames upon which the Idle Cell Aligner mode as depicted in FIG. 8 operates.

FIG. 9 shows a simplified example of the Idle Cell Aligner mode operating upon a set of frames comprising 53 frames, with each frame having of thirty time slots. Reference numeral 8A-1 in FIG. 9 shows location of an HEC of a potential idle cell header. The locating of the preceding four bytes of the idle cell header is depicted by reference numeral 8A-2. Reference numeral 8A-3 pinpoints location of the first byte, e.g, first time slot, of the found header. For sake of simplification, it turns out that all bytes forming the initially found idle cell header are in the same frame (illustrated, e.g., as the first row of the set of frames of FIG. 9) and, therefore, that the frame/delay value is zero for all such time slots. It should be understand that such is not always, or even usually, the case. Rather, there can be a frame delay for one or more of the time slots, similar to that depicted by FIG. 5A, for example. For this reason it is specified above that substep 8A-2 that time slot aligner 60 checks the preceding four time slots in nearby frames in order to find the remainder of a complete idle cell header.

Thus, FIG. 9 shows an initial idle cell header being found in frame 1, with the first byte of the idle cell header beginning in time slot 14. It should be kept in mind that the initial idle cell header may not be located in the first frame of the set of frames.

At step 8-3 the time slot aligner 60 forms a window based on the pattern of frame/delay values noted from the initial idle cell header. The formation of such window is understood with respect to comparable window WA previously discussed in connection with FIG. 5A, it being understood however that the configuration of the window depends on the frame/delay values noted at substep 8A-4. Again it is said that the window is based on selected time slots, in view of the fact that only the last four time slots of the initial idle cell header are utilized for the window.

At step 8-4 the time slot aligner 60 uses a known or predetermined relationship in order to determine a frame having a next header, i.e., a header beginning in the time slot subsequent to the first time slot of the preceding header. The known relationship provides a value X indicative of the number of frames separating the first ATM cell and the second ATM cell. In other words, the time slot aligner 60 can find the next ATM cell X frames after the cell having the just-located header or X frames before the cell having the just-located header. The relationship for finding X is given by Equation 1:

$$X=(Y^* 53)\text{div UTS} \quad \text{Equation 1.}$$

In Equation 1, UTS is the number of used time slots in the set of frames, and Y is the lowest positive integer which fulfills the criteria that $[(Y^*53) \bmod \text{UTS}]=1$.

Thus, in the example of FIG. 9, the time slot aligner 60 can predict that the header for the ATM cell beginning in the next time slot, i.e., time slot 14. Using Equation 1 as explained above, the beginning of the next header is predicted for FRAME 31 in fulfillment of step 8-4.

With the beginning of the next header determined at step 8-4, all but the HEC bytes of the next header are determined at step 8-5 by using the previously developed window (e.g., the window developed at step 8-3). That is, with reference to the example of FIG. 9, any frame/delays for time slots 14–17 note for the initial idle cell are also applicable to this next cell, so that the first four bytes of this next cell can be easily located at step 8-5.

With the location (e.g., frames) for the first four bytes of the next header determined at step 8-5, and consequentially the contents thereof, an HEC over these first four bytes is computed at step 8-6. Calculations of an HEC over four known bytes is well known in the art, being described (for example) by Avram Perez, "Byte-wise CRC Calculations", *IEEE Micro* 3, 40 (1983).

Once the HEC byte for the header of this next cell has been computed at step 8-6, it is a simple matter at step 8-7 to search for a frame having the computed value in the HEC-associated time slot for this next header. Upon locating the frame having the is computed value in the HEC-associated time slot, at step 8-8 a frame/delay value for this time slot is determined in accordance with the frame in which the computed HEC value is found. For example, if (like in FIG. 5B) the HEC value were offset from the remainder of the header by two frames, a frame/delay of +2 would be assigned to this time slot.

Step 8-9, like step 4-5, is a check to determine if frame/delays have been determined for all time slots of the set of frames. If there are time slots remaining for which a frame/delay has yet to be determined, time slot aligner 60 forms a new window at step 8-10 on the basis of the most recently detected header for use in connection with yet another header (in similar manner as step 4-7 of the Trial and HEC-Error mode). Then, using the newly constructed window, execution loops back to step 8-4 for repetition of at least step 8-4 through step 8-9 in search of the header for the next cell.

When it is determined at step 8-9 that a frame/delay has been determined for all time slots, the Idle Cell Aligner mode is concluded as indicated by step 8-11. The time slot aligner 60 can then begin to receive other set of frames and, based on the time slot alignments determinations already made, process the set of frames by making proper slot alignments and thereby recovering full ATM cells.

FIG. 9 thus shows the locating of headers beginning in successive time slots in the manner prescribed by the logic of FIG. 8, such that frame/delays for all time slots of the set of frames are determined. In connection with the set of frames, it is noted that the letters "xx" represent a non-HEC header byte, and the letters "yy" represent a HEC byte of a header.

It is to be noted that while the Idle Cell Aligner mode begins with location of an idle cell header, the Idle Cell Aligner mode is not confined thereto and that cells subsequent to the first located header need not be idle cells. This is accommodated particularly in view of the fact that, at step 8-6, the HEC for a non-idle cell header is computed. If the next cell were an idle cell, of course, the HEC therefore would nevertheless be located by the logic of the Idle Cell Aligner mode.

Moreover, it should be understood that the Idle Cell Aligner mode is not confined to employment only with idle cells, but that the mode can also be used with respect to other types of empty cells. For example, the Idle Cell Aligner mode can instead involve unassigned cells and IMA filler cells, having predetermined headers as described above. In such instances, the Idle Cell Aligner mode looks for the respective predetermined headers of the empty cells, e.g., the unassigned cells and IMA filler cells. Moreover, the Idle Cell Aligner mode can be configured such that it first tries to align using idle cells, and if an idle cell is not found then a search is made for another type of empty cell, e.g., a filler cell, etc.

Figure 10:
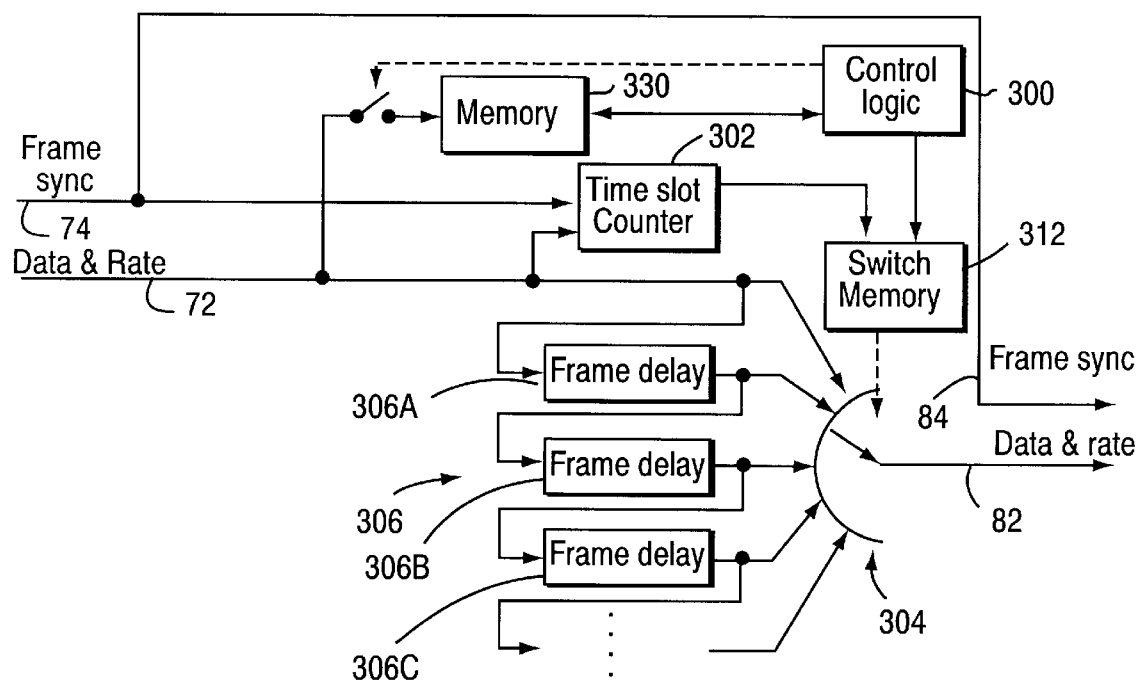
FIG. 10 is schematic view of functional blocks employed in a time slot aligner which performs the Idle Cell Aligner mode of FIG. 8.

FIG. 10 shows major function blocks of a time slot aligner 60 which implements the Idle Cell Aligner mode time slot alignment determination technique having the functions (e.g., steps) basically described in FIG. 8. The time slot aligner 60 of FIG. 10 has some similar functions to those noted with respect to FIG. 7. In particular, time slot aligner 60 of FIG. 10 has a controller 300; a time slot counter 302; a bank of frame delay memories; switch 304; and switch memory 312. In addition, the time slot aligner 60 of FIG. 9 has a memory 330 which is used for storing at least 53 consecutive frames for the purposes previously mentioned in connection with the operation of FIG. 8, including being referenced by controller 300 for estimating the frame delays. Logic within controller 300 serves as a cell header detector for detecting cell headers in accordance with the detection process described above.

Common to both the Trial and HEC-Error mode of FIG. 4 and the Idle Cell Aligner mode of FIG. 8 is the initial task of searching through plural time slots and plural frames in order to find an initial header. In accordance with one aspect of the present invention, this initial search is accomplished using a searching tree. In addition, the moving alignments for searching for one byte of a header (e.g., the HEC byte) can also be implemented using a searching tree.

A searching tree enables a faster search, using lowest and known or probably delays first before trying other delay values. Further, use of a search tree enables gradual rollback if a branch leads to a false tree. Moreover, use of a search tree limits the search to the estimated maximum difference in delay, e.g., skipping unrealistic combinations.

Figure 11:
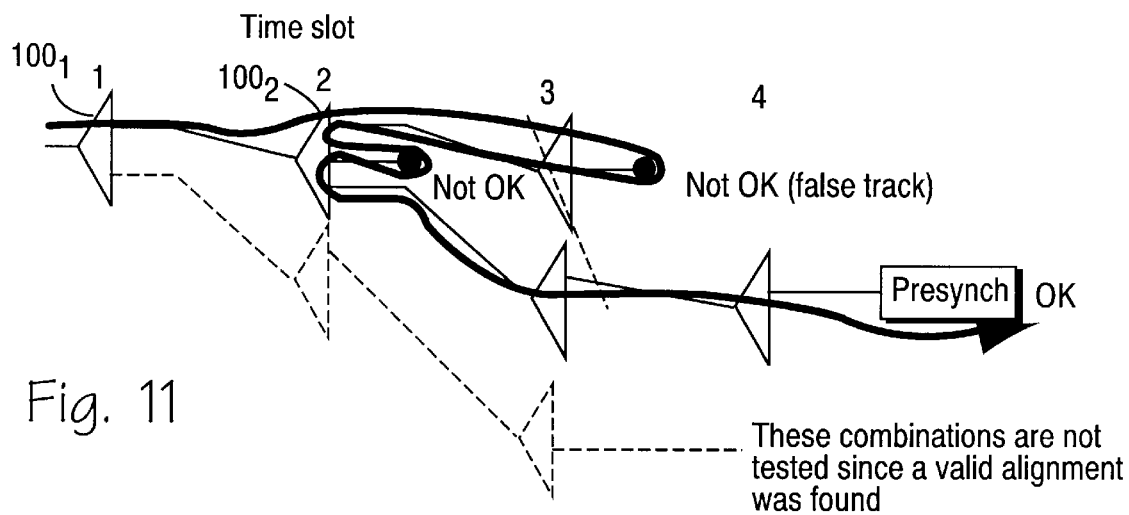
FIG. 11 is a schematic view showing operation of a search tree suitable for use with the time slot alignment determination technique of the present invention.
Figure 11A:
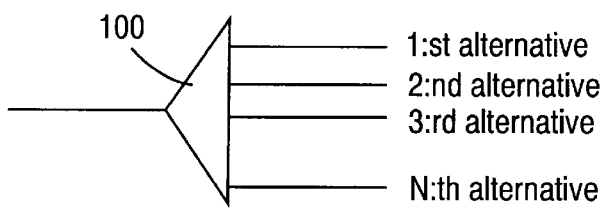
FIG. 11A is a schematic viewing showing a hypothesis node according to the search tree of FIG. 11.

FIG. 11 illustrates a search tree approach suitable for the time slot alignment determination technique of the present invention. Each node of the search tree, represented by an on-edge scalene triangle, represents an hypothesis with several alternatives leading to a new hypothesis. A hypothesis is a set of compensations for previous time slots and the alternative is the settings in the new time slot in priority order. In this regard, see FIG. 11A wherein node 100 has N alternatives branching therefrom. Returning to FIG. 11, node $100_1$ for time slot 1 has two alternatives, one of which (as represented by the broken line) has already been found invalid. The other alternative from node $100_1$ leads to node $100_2$ of time slot 2, which has three alternatives. From FIG. 11 it can be seen that success was obtained with the bytes of time slots 1 and 2 being found in a first frame and the bytes of time slots 3-4 being found in a subsequent frame.

In the search tree approach, the frame compensation (e.g., frame/delay) alternatives are selected in the priority of the following steps:

1. Trying first alternates within the range of the hypothesis starting with the smallest compensation.
2. Then testing compensations that are outside of the hypothesis, letting every second hypothesis being above the existing hypothesis and the other hypothesis below the existing hypothesis.
3. Stopping when the compensation together with the hypothesis is beyond what is likely (e.g., beyond a maximum range of compensation).

Figure 12:
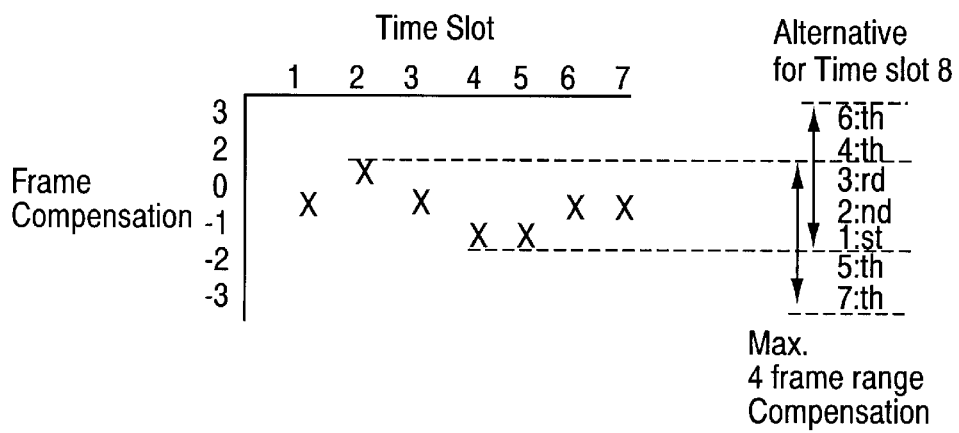
FIG. 12 is diagrammatic view depicting an example implementation of a search tree in conjunction with the time slot alignment determination technique of the present invention.

As an example, assume that the maximum range of compensation (e.g., frame/delay) is set to four, and that the hypothesis has the compensation in previous time slots of {0,1,0,−1,−1,0,0}. The compensation for time slot 8 will therefore have the following order: −1,0,1,2,2,3,−3 (1st alternative, 2nd alternative, etc.). This is illustrated in FIG. 12.

It should be understood that the technique of the present invention of aligning the first octet PA of the payload of the cell having header HA time slots and determining time slot frame/delay is not limited to the particular illustrative environment shown in FIG. 1B, nor confined for use in connection with a GSM network or any other particular network. Moreover, the particular functional blocks illustrated in FIG. 7 and FIG. 10 show merely examples for illustrating the techniques of the invention. The steps for each mode of the technique can be implemented by numerous structural configurations, with the invention not being specific to any particular structural or circuit implementation.

In general, the Idle Cell Aligner mode is believed to be faster than the Trial and HEC-Error mode. In this regard, the Trial and HEC-Error mode may take a longer time for maximum delays above three frames. The Idle Cell Aligner mode, however, requires at least one idle cell in the sample set of frames upon which the calibration is made. Overall, the calibration, e.g., frame/delay determination, time is small and proportional to the number of used time frames and the maximum delay difference.

The time for calibrating using the Trial and HEC-Error mode is reported in FIG. 13 for a scenario involving a hardware implementation of the time slot aligner 60, with frame rate of 8 kHz (cycle rate 6.6 ms (+53/8)), 30 time slots employed (e.g., 25 moving windows), and six presync cycles for each header detection. It should be apparent that performance can be improved by reducing the presync value, and using search tree logic (with the most likely alternative being first chosen in the search). The term "presync" as used herein is understood with reference to 1.432 chapter 4.5, it being understood however that for the present invention presync involves a repetition rate of 53 frames rather than 53 octets as set forth in I.432 chapter 4.5.

In general, both the Trial and HEC-Error mode and the Idle Cell Aligner mode share the basic principles of using the ATM header with its HEC to estimate the frame/delay for time slots. Initial calibration begins by detecting the five consecutive time slots of a header, which can be done either by the Trial and HEC-Error mode or the Idle Cell Aligner mode. Correct calibration will result in detection of a correct header (e.g., four bytes followed by a valid HEC byte) in the five consecutive time slots, with these time slots having other headers in a period of fifty three frames. The moving window of the time slot alignment determination techniques of the invention involves gradually moving the window by one time slot, and with each move performing a calibration with respect to the new time slot encompassed by the window. Thereby a new header if found.

Thus, the time slot alignment determination technique of the present invention provides rapidity without the necessity of signaling for generation of a test pattern. The calibration of the time slot alignment determination technique of the present invention is implemented using normal ATM traffic. Moreover, the time slot alignment determination technique of the present invention works with any PCM systems as long as the number of used time slots is less then 53. Simple logic is implemented easily in many ways, such as in a programmable logic device (PLD) that is situated between commercially available framers and transmission convergence circuits. The time slot alignment determination technique of the present invention has no adverse impact on ATM switches, and requires no modification of time slot switches. Yet further, advantageously the time-slot alignment determination technique works with both a complete frame and when a fraction of the time slots is being employed.

The Trial and HEC-Error Mode is quite resistant towards bit errors that corrupt the cell header. The Idle Cell Aligner mode request that all bit in headers in the 53 frames be correct, e.g., a total of 2120 bits (8 bits/byte*5 header bytes per frame*53 frames). A bit error rate of 1E-6 has a probability (that one bit is wrong) of 0.2%. For 1E-3 the probability is 88%. The Align Hunt state mentioned above resolves this high error probability issue since the time slot aligner runs continuously, with new samples each time, until a successfully aligned sample is found. It is possible to change the search header in the initial search between each aligning sequence, e.g., between headers for "Idle Cells" and "IMA filler cells". The Align Hunt state also resolves the problem of having a very low frequency of idle cells.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the Idle Cell Aligner mode can be utilized with IMA filler cells instead.

What is claimed is:

1. A method of determining frame delay for time slots of ATM cells in a set of frames, the method comprising:

(1) searching one or more frames of the set of frames to determine whether contents of a first plurality of consecutive time slots in the one or more frames satisfies a predetermined criteria; and upon satisfying the predetermined criteria, (2) determining, with respect to each of the first plurality of consecutive time slots, a delay value in accordance with which of the frames had contents satisfying the criteria, the delay value being a number of frames corresponding to an offset from a reference frame for the first plurality of consecutive time slots.

2. The method of claim 1, wherein step (1) is repeated for a second plurality of consecutive time slots, and wherein step (2) is repeated for at least one time slot in the second plurality of consecutive time slots.

3. The method of claim 2, wherein a constituency of the second plurality of consecutive time slots differs from a constituency of the first plurality of consecutive time slots by only one time slot.

4. A method of determining frame delay for time slots of ATM cells in a set of frames, the method comprising:
 (1) searching one or more frames of the set of frames to determine whether contents of a first plurality of consecutive time slots in the one or more frames satisfies a predetermined criteria; and upon satisfying the predetermined criteria,
 (2) determining, with respect to each of the first plurality of consecutive time slots, a delay value in accordance with which of the frames had contents satisfying the criteria;
 wherein the first plurality of consecutive time slots is q consecutive time slots; wherein step (1) is repeated for a N number of q consecutive time slots; wherein for each of the N number of q consecutive time slots step (2) is repeated for at least one time slot; and the number of time slots in the set of frames is N+(q+1).

5. The method of claim 1, wherein the predetermined criteria is that the contents of the first plurality of consecutive time slots form an ATM cell header including a valid header error check (HEC) byte.

6. The method of claim 1, wherein the predetermined criteria is that the contents of the first plurality of consecutive time slots form an ATM cell header including a valid header error check (HEC) byte for an idle cell.

7. The method of claim 1, wherein the first plurality of consecutive time slots is five consecutive time slots.

8. The method of claim 1, wherein step (1) is performed using a search tree.

9. A method of determining frame delay for time slots of ATM cells in a set of frames, the method comprising:
 (1) searching one or more frames of the set of frames to determine whether contents of a first plurality of consecutive time slots in the one or more frames satisfies a predetermined criteria, the predetermined criteria being that the contents of the first plurality of consecutive time slots form a header of an ATM cell including a valid header error check (HEC) byte, a first time slot in the first plurality of consecutive time slots containing a first byte of a header for a first ATM cell; and upon satisfying the predetermined criteria,
 (2) determining, with respect to each of the first plurality of consecutive time slots, a delay value in accordance with which of the frames had contents satisfying the criteria; and
 (3) using an equation to determine which frame of the set of frames has a header of a second ATM cell beginning in the second time slot of the first plurality of consecutive time slots.

10. The method of claim 9, wherein the equation provides a value X indicative of a number of frames separating the first ATM cell and the second ATM cell, wherein the equation is X=(Y*53) div UTS, wherein UTS is a number of used time slots in the set of frames, wherein Y is chosen such that the quantity=1.

11. The method of claim 9, further comprising:
 (4) using delay values determined at step (2) for the second and subsequent time slots of the first plurality of consecutive time slots in order to determine contents of non-HEC bytes of the header of the second ATM cell;
 (5) using the contents of non-HEC bytes of the header of the second ATM cell determined at step (4) to compute a HEC value for the second ATM cell;
 (6) locating the HEC value computed at step (5) in the one or more frames of the set of frames in a last time slot of the second plurality of consecutive time slots; and
 (7) determining, for the last time slot of the second plurality of consecutive time slots, a delay value in accordance with a frame in which the HEC value computed at step (5) is located.

12. The method of claim 11, wherein steps (3) through (7) are repeated for a predetermined number of ATM cells in the set of frames.

13. An ATM node comprising framer and line circuit which receive a set of frames, a time slot aligner which receives the set of frames from the framer and line circuits, and wherein the time slot aligner searches one or more frames of the set of frames to determine whether contents of a first plurality of consecutive time slots in the one or more frames satisfies a predetermined criteria, and which determines, with respect to each of the first plurality of consecutive time slots, a delay value in accordance with which of the frames had contents satisfying the criteria, the delay value being a number of frames corresponding to an offset from a reference frame for the first plural of consecutive time slots.

14. A telecommunications network having a plurality of nodes, at least one of which is an ATM node, the ATM node comprising:
 framer and line circuits which receive a set of frames;
 a time slot aligner which receives the set of frames from the framer and line circuits, and wherein the time slot aligner searches one or more frames of the set of frames to determine whether contents of a first plurality of consecutive time slots in the one or more frames satisfies a predetermined criteria, and wherein the time slot aligner determines, with respect to each of the first plurality of consecutive time slots, a delay value in accordance with which of the frames had contents satisfying the criteria, the delay value being a number of frames corresponding to an offset from a reference frame for the first plural of consecutive time slots.

15. A method of determining frame delay for time slots of ATM cells in a set of frames, the method comprising:
 (1) finding a cell header and determining a frame delay of time slots therein;
 (2) forming a window based on selected time slots of the header found at step (1);
 (3) shifting the window across a time slot of the set of frames and using the window to find a next header having non-HEC time slots in agreement with the window; and
 (4) determining a frame delay of the HEC time slot for the header found at step (3).

16. The method of claim 15, further comprising forming a new window using selected time slots of the header found at step (3) and repeating steps (3) and (4) with respect to yet another header.

17. A method of determining frame delay for time slots of ATM cells in a set of frames, the method comprising:
 (1) finding an initial cell header and determining a frame delay of time slots therein;
 (2) forming a window based on selected time slots of the header found at step (1);
 (3) using a predetermined relationship to determine a frame having a next header beginning in a time slot subsequent to a first time slot of a preceding header;
 (4) using the window to find non-HEC time slots of the next header;

(5) computing a value for an HEC byte for the next header;

(6) locating a frame having the HEC value computed at step (5) for the HEC time slot of the next header; and (7) determining a frame delay of the HEC time slot for the next header.

18. The method of claim 17, further comprising forming a new window using selected time slots of the next header found and repeating steps (3) through (7) with respect to yet another header.

19. A method of determining frame delay for time slots of ATM cells in a set of frames, the method comprising:

(1) searching one or more frames of the set of frames to determine whether contents of a first plurality of consecutive time slots in the one or more frames satisfies a predetermined criteria, the predetermined criteria being that the contents of the first plurality of consecutive time slots form a header of an ATM cell including a valid header error check (HEC) bytes a first time slot in the first plurality of consecutive time slots containing a first byte of a header for a first ATM cell; and upon satisfying the predetermined criteria; and, (2) using an equation to determine which frame of the set of frames has a header of a second ATM cell beginning in the second time slot of the first plurality of consecutive time slots.

20. The method of claim 19, wherein the equation provides a value X indicative of a number of frames separating the first ATM cell and the second ATM cell, wherein the equation is X=(Y*53) div UTS, wherein UTS is a number of used time slots in the set of frames, wherein Y is chosen such that the quantity=1.

21. A method for use in an ATM node which receives ATM cells in a set of frames and which performs the following steps:

(1) searching one or more frames of the set of frames to determine whether contents of a first plurality of consecutive time slots in the one or more frames satisfies a predetermined criteria, the predetermined criteria being that the contents of the first plurality of consecutive time slots form a header of an ATM cell including a valid header error check (HEC) bytes a first time slot in the first plurality of consecutive time slots containing a first byte of a header for a first ATM cell; and upon satisfying the predetermined criteria, (2) determining, with respect to each of the first plurality of consecutive time slots, a delay value in accordance with which of the frames had contents satisfying the criteria; and (3) using an equation to determine which frame of the set of frames has a header of a second ATM cell beginning in the second time slot of the first plurality of consecutive time slots.

22. A method for use in an ATM node which receives ATM cells in a set of frames and which performs the following steps:

(1) finding a cell header and determining a frame delay of time slots therein;

(2) forming a window based on selected time slots of the header found at step (1);

(3) shifting the window across a time slot of the set of frames and using the window to find a next header having non-HEC time slots in agreement with the window; and (4) determining a frame delay of the HEC time slot for the header found at step (3).

23. A method for use in an ATM node which receives ATM cells in a set of frames and which performs the following steps;

(1) finding an initial cell header and determining a frame delay of time slots therein;

(2) forming a window based on selected time slots of the header found at step (1);

(3) using a predetermined relationship to determine a frame having a next header beginning in a time slot subsequent to a first time slot of a preceding header;

(4) using the window to find non-HEC time slots of the next header;

(5) computing a value for an HEC byte for the next header;

(6) locating a frame having the HEC value computed at step (5) for the HEC time slot of the next header; and (7) determining a frame delay of the HEC time slot for the next header.

* * * * *